(12) United States Patent
Maani (10) Patent No.: US 10,721,488 B2
(45) Date of Patent: Jul. 21, 2020

(54) B-PICTURE SYNTAX CHANGE FOR GENERALIZED BI-PREDICTION IN HIGH EFFICIENCY VIDEO CODING (HEVC)

(71) Applicant: SONY CORPORATION, Tokyo (JP)

(72) Inventor: Ehsan Maani, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/399,282

(22) Filed: Apr. 30, 2019

(65) Prior Publication Data

US 2019/0261015 A1 Aug. 22, 2019

Related U.S. Application Data

(63) Continuation of application No. 13/350,742, filed on Jan. 14, 2012, now Pat. No. 10,362,327.

(60) Provisional application No. 61/432,925, filed on Jan. 14, 2011.

(51) Int. Cl.
*H04N 19/513* (2014.01)
*H04N 19/70* (2014.01)

(52) U.S. Cl.
CPC .......... *H04N 19/513* (2014.11); *H04N 19/70* (2014.11)

(58) Field of Classification Search
None
See application file for complete search history.

(56) References Cited

U.S. PATENT DOCUMENTS

| 8,718,140 | B1 | 5/2014 | Cai et al. |
| 2005/0152452 | A1 | 7/2005 | Suzuki |
| 2005/0193408 | A1 | 9/2005 | Sull et al. |
| 2008/0232472 | A1 | 9/2008 | Kwon |
| 2011/0007803 | A1 | 1/2011 | Karczewicz et al. |
| 2011/0206123 | A1 | 8/2011 | Panchal et al. |

OTHER PUBLICATIONS

Notice of Allowance and Fees Due for U.S. Appl. No. 13/350,742, dated Mar. 12, 2019, 08 pages.
Non-Final Rejection for U.S. Appl. No. 13/350,742, dated Sep. 26, 2018, 16 pages.
Advisory Action for U.S. Appl. No. 13/350,742, dated Jul. 6, 2018, 02 pages.
Final Rejection for U.S. Appl. No. 13/350,742, dated May 11, 2018, 12 pages.
Non-Final Rejection for U.S. Appl. No. 13/350,742, dated Dec. 13, 2017, 10 pages.
Advisory Action for U.S. Appl. No. 13/350,742, dated Oct. 5, 2017, 03 pages.
Final Rejection for U.S. Appl. No. 13/350,742, dated Aug. 1, 2017, 11 pages.
Non-Final Rejection for U.S. Appl. No. 13/350,742, dated Mar. 2, 2017, 09 pages.
Final Rejection for U.S. Appl. No. 13/350,742, dated Aug. 25, 2016, 09 pages.

(Continued)

*Primary Examiner* — Frederick D Bailey
(74) *Attorney, Agent, or Firm* — Chip Law Group (57) ABSTRACT

An enhanced prediction direction method and encoding syntax for B-pictures in state-of-the-art video compression. In bi-directional prediction, instead of using one motion vector (MV) from list 0 and one from list 1, both may be alternatively drawn from list 0 or list 1, and this information communicated to a decoder similarly configured for recognizing the generalized syntax.

6 Claims, 6 Drawing Sheets

(56) References Cited

OTHER PUBLICATIONS

Non-Final Rejection for U.S. Appl. No. 13/350,742, dated Apr. 15, 2016, 12 pages.
Final Rejection for U.S. Appl. No. 13/350,742, dated May 29, 2015, 10 pages.
Non-Final Rejection for U.S. Appl. No. 13/350,742, dated Sep. 22, 2014, 15 pages.

B-PICTURE SYNTAX CHANGE FOR GENERALIZED BI-PREDICTION IN HIGH EFFICIENCY VIDEO CODING (HEVC)

CROSS-REFERENCE TO RELATED APPLICATIONS

The application is a continuation of U.S. patent application Ser. No. 13/350,742 filed on Jan. 14, 2012, which claims the benefit of priority from U.S. provisional patent application Ser. No. 61/432,925 filed on Jan. 14, 2011. Each of the above-referenced applications is hereby incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to video coding, and more particularly to controlling inter-prediction in a B-picture during video coding.

2. Description of Related Art

Efficient video storage and communication requires coding mechanisms for reducing spatial and temporal redundancies. Ongoing efforts are directed at increasing the efficiencies of these enCOder/DECoders (codecs) which respectively compress and decompress video data streams. The purpose of codecs is to reduce the size of digital video frames in order to speed up transmission and save storage space. Video coding advances have collectively contributed to the high levels of coding efficiency provided by state-of-the-art codecs. The latest of these developing coding standards is referred to as High Efficiency Video Coding (HEVC), from the Joint Collaborative Team on Video Coding (JCT-VC), which is a joint effort of the MPEG and VCEG standardization committees.

Three different types of frames are encoded, I, P and B frames. Intra coded (I) frames are coded based on spatial redundancy only, without benefit of dependence on surrounding frames. Predicted coded (P) frames are coded using prediction from prior encoded I or P frame(s). Bi-directional coded (B) frames are coded with bi-directional (forward and backward) prediction information, yet are never used for P frame prediction. The benefit of providing forward encoding is the ability to match a background area that was occluded in the previous frame. Bi-directional prediction allows for decreased noise by averaging both forward and backward prediction. It will be noted that coding B frames is more complex since frames are decoded out of order with respect to the order in which they are captured or are to be displayed.

The type of encoding is determined within the encoder for each frame, and the coding type is communicated to the decoder so that it can properly decode the frames. Modern encoders are configured within a B-frame for performing a single prediction of either direction, or a bi-directional prediction taking one motion vector from each list, and does not always provide optimum prediction.

Accordingly, the present invention provides enhanced prediction and overcomes shortcomings of previous approaches.

BRIEF SUMMARY OF THE INVENTION

Control and communication of B-picture prediction is described using a new generalized bi-directional prediction (GBP) syntax, such as within a coding apparatus or system according to the nascent high efficiency video coding (HEVC) standard. Decisions as to prediction direction are made at the encoder based on conditions and/or parameters, such as rate-distortion cost, for communication to the decoder. In typical encoders, a binary bit is used for selecting between bi-directional prediction and single prediction. In the case of single prediction a second bit is sent to indicate which prediction list to utilize, selecting forward or backward prediction. Bi-directional prediction is fixed for obtaining one MV from each list.

The present invention, however, changes the bi-prediction case to specify that both motion vectors can be from the same list, and a selection is made and communicated as to which list. This generalized bi-directional prediction (GBP) syntax beneficially provides improved prediction since the compression noise can be reduced by the averaging process taking in the two motion vectors from the same list.

Further aspects and embodiments of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only.

DETAILED DESCRIPTION OF THE INVENTION

B-picture inter-prediction coding is enhanced to increase performance in a flexible syntax. In the case of two motion vectors (MVs) being selected in bi-directional prediction, the MVs can be selected from the same list (forward or backward), which is unlike previous encoding schemes which required either selecting one MV from either list, or two MVs with one from each list.

Figure 1:
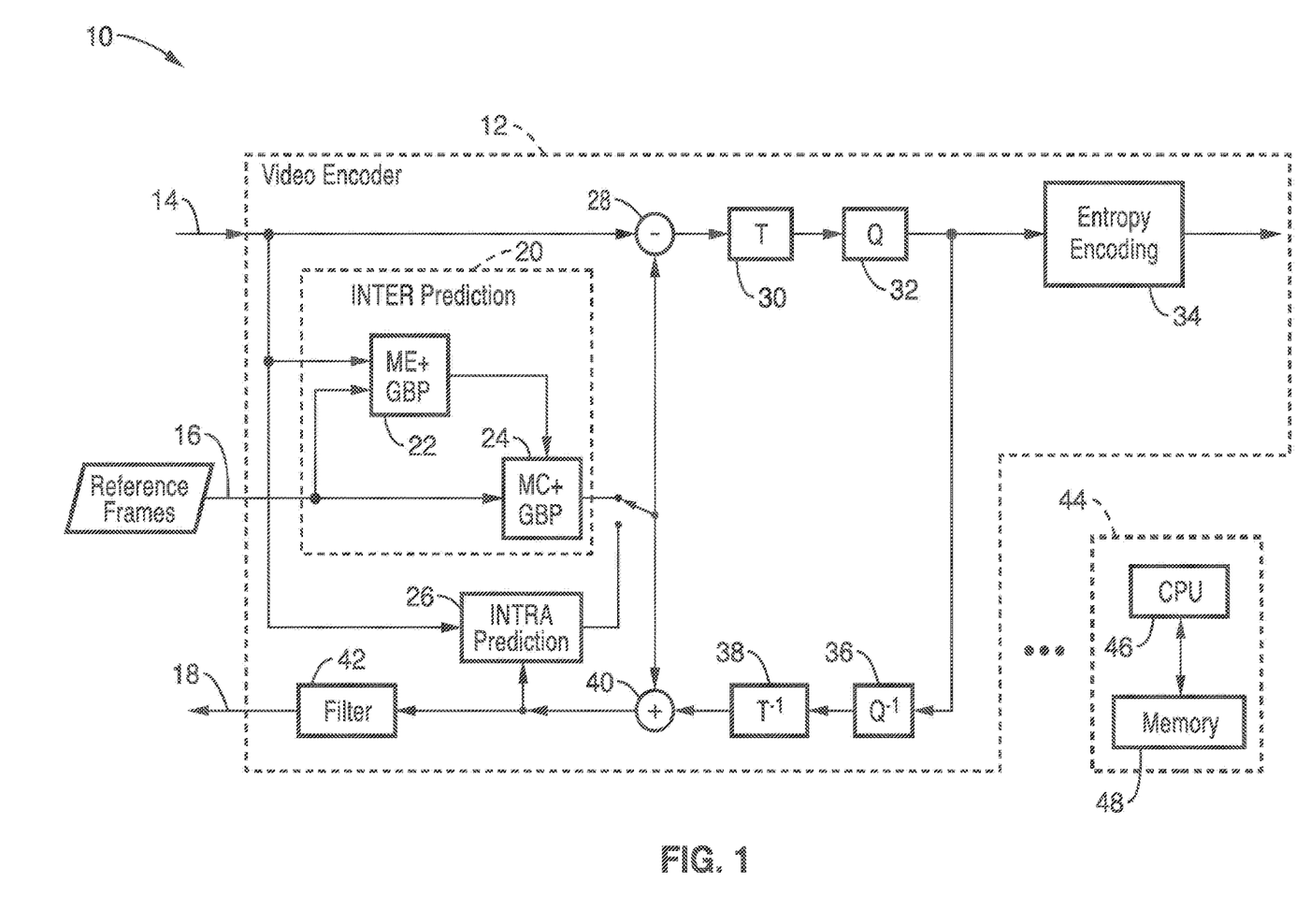
FIG. 1 is a schematic of a video encoder configured for enhanced bi-prediction according to an embodiment of the present invention.

FIG. 1 illustrates an example embodiment of a coding apparatus comprising an encoder 10 according to the invention for performing a generalized form of bi-directional prediction (GBP). The invention is implemented within the motion estimation and motion compensation blocks, shown containing generalized bi-directional prediction (GBP), but otherwise can rely on conventional video coding which maximizes compatibility with coding systems.

The encoder 10 is shown with encoding elements 12 executed by one or more processors 44. In the example, video frame input 14 is shown along with reference frames 16 and frame output 18. Inter-prediction 20 is depicted with motion estimation (ME) 22 and motion compensation (MC) 24, which are each shown including programming for performing generalized bi-directional prediction (GPB). Intra prediction 26 is shown and switching is depicted between inter prediction and intra prediction. A sum junction 28 is shown with output to a forward transform 30, quantization stage 32 and entropy encoding 34. Inverse quantization 36 and inverse transform 38 operations are shown coupled to a summing junction 40 followed by a filter 42, such as a deblocking and/or loop filter.

It should be appreciated that the encoder is shown implemented with a processing means 44, such as comprising at least one processing device (e.g., CPU) 46 and at least one memory 48 for executing programming associated with the encoding. In addition, it will be appreciated that elements of the present invention can be implemented as programming stored on a media, which can be accessed for execution by a CPU for the encoder 10 and/or decoder 50.

Figure 2:
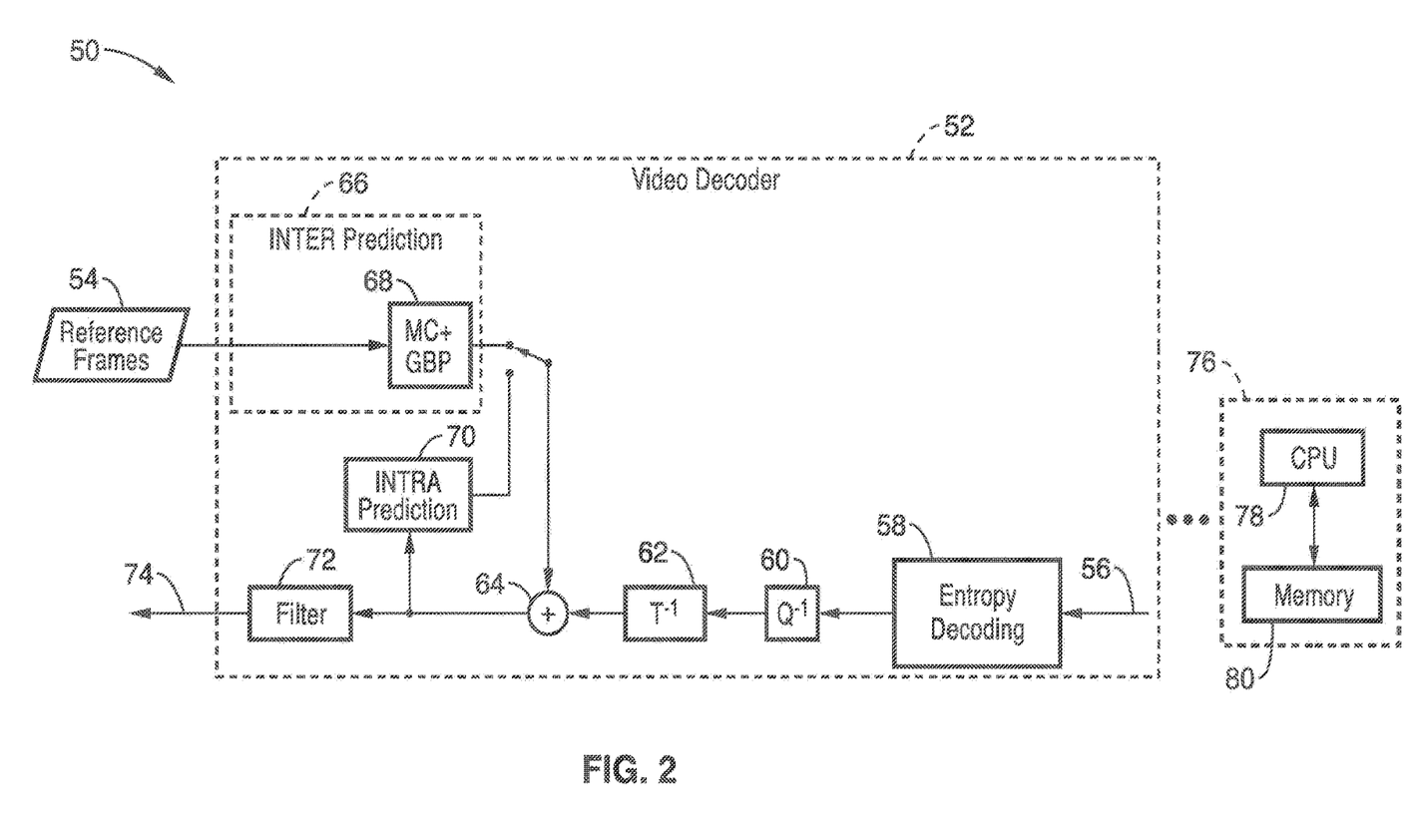
FIG. 2 is a schematic of a video decoder configured for enhanced bi-prediction according to an embodiment of the present invention.

FIG. 2 illustrates an example embodiment 50 of a decoder, shown with process blocks 52 and an associated processing means 76. It will be noted that the decoder is substantially a subset of the elements contained in encoder 10 of FIG. 1, operating on reference frames 54 and outputting video 74. The decoder blocks receive an encoded video signal 56 which is processed through entropy decoder 58, inverse quantization 60, inverse transform 62 according to an embodiment of the invention. Summing 64 is shown between the inverse transform 62 output and the selection between inter prediction 66 shown with motion compensation 68 which includes programming for performing generalized bi-directional prediction (GPB), and a separate intra prediction block 70. Output from summing junction 64 is received by filter 72, which can be configured as a loop filter, a deblocking filter, or any combination thereof. It should be appreciated that the decoder can be implemented with a processing means 76 which comprises at least one processing device 78 and at least one memory 80 for executing programming associated with the decoding. In addition, it will be noted that elements of the present invention can be implemented as programming stored on a media, wherein said media can be accessed for execution by processing device (CPU) 78.

It will be appreciated that elements of the present invention 10 and 50 are implemented for execution by a processing means 44 and 76, such as in response to programming resident in memory 48 and 80 which is executable on CPU 46 and 78. In addition, it will be appreciated that elements of the present invention can be implemented as programming stored on a media, wherein said media can be accessed for execution by CPU 46 and 78.

It should be appreciated that the programming is executable from the memory which is a tangible (physical) computer readable media that is non-transitory in that it does not merely constitute a transitory propagating signal, but is actually capable of retaining programming, such as within any desired form and number of static or dynamic memory devices. These memory devices need not be implemented to maintain data under all conditions (e.g., power fail) to be considered herein as non-transitory media.

Figure 3A:
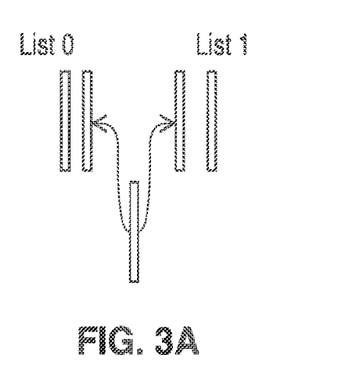
FIGS. 3A, 3B, 3C, 3D, and 3E are diagrams of list selection according an embodiment of the present invention.
Figure 3B:
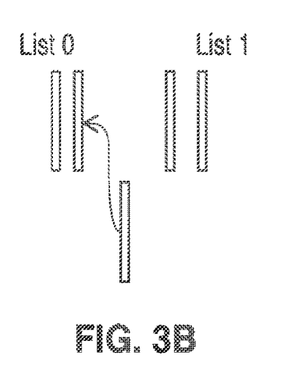
Figure 3C:
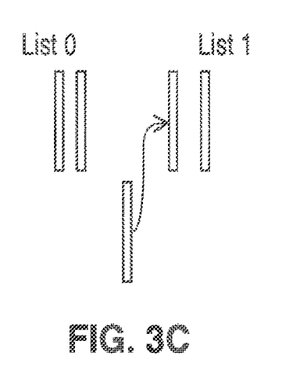
Figure 3D:
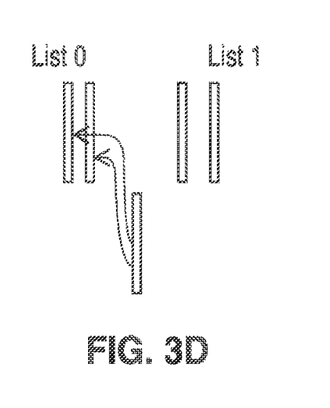
Figure 3E:
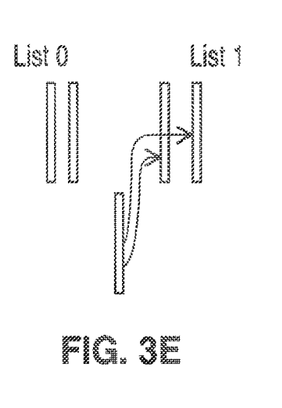

FIGS. 3A, 3B, 3C, 3D, and 3E illustrate frames in the video buffer ready for use in motion compensated prediction with arrows showing prediction from a frame in the reference buffer, corresponding to a motion vector (MV), according to the present invention. FIGS. 3A, 3B, and 3C indicate conventional prediction selections, specifically, bi-directional prediction with one MV taken from the first list (list 0) and second list (list 1) in FIG. 3A, one MV from the first list (list 0) in FIG. 3B, or taking one MV from the second list (list 1) in FIG. 3C. FIG. 3D and FIG. 3E represent additional (enhanced) prediction selections according to the invention, in particular selecting both MVs from the first list (list 0) in FIG. 3D and selecting both MVs from the second list (list 1) in FIG. 3E. There can be a maximum of two motion vectors per list, which the present invention beneficially utilizes.

Figure 4:
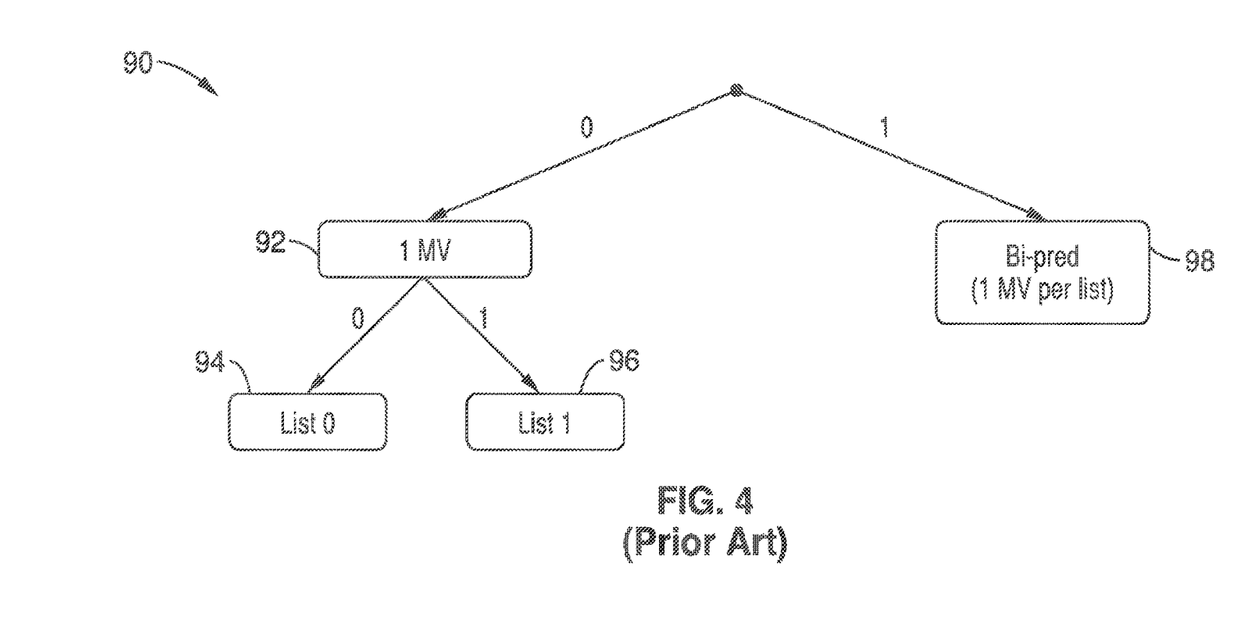
FIG. 4 is a binary tree of prediction direction syntax for a conventional system which can select a single list or one MV from both lists.

FIG. 4 illustrates an embodiment 90 of binary syntax associated with conventional MV selection during prediction. A binary "0" (on the left) depicts selecting a single prediction 92 (one motion vector), with an additional binary bit specifying whether list 0, a first list, 94 is selected (e.g., shown as binary "0") or list 1, a second list 96 (e.g., shown as binary "1"). The other alternative from the top of the tree is a binary "1" (on the right) depicting selection of bi-directional prediction which is configured to take one motion vector (MV) from each list 98.

Figure 5:
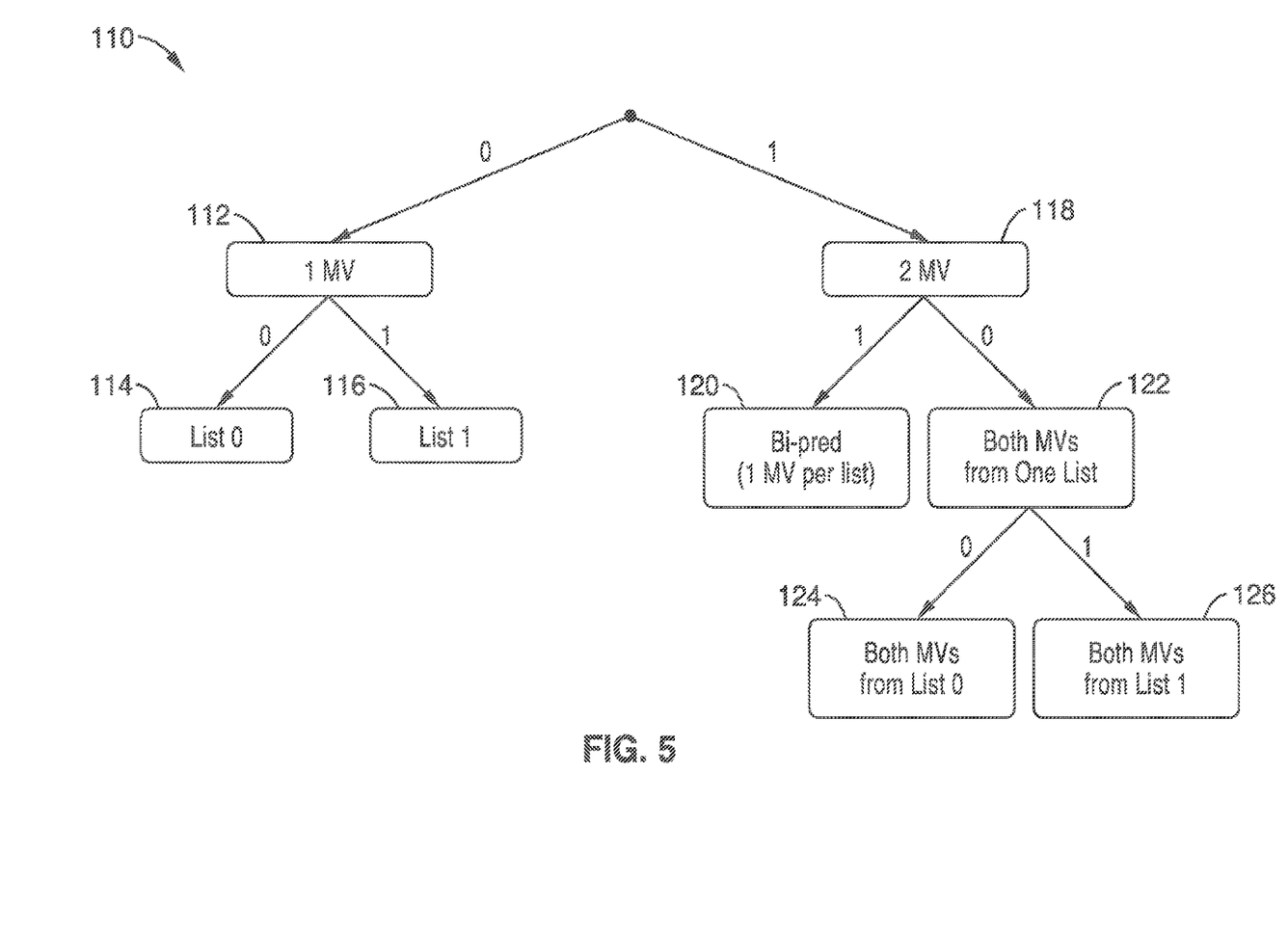
FIG. 5 is a binary tree of prediction direction syntax according to an embodiment of the present invention, which also allows selecting multiple MVs from either list.

FIG. 5 illustrates an embodiment 110 of generalized bi-directional prediction (GBP) according to the invention showing an example binary syntax associated with MV selection according to the present invention. A binary "0" (on the left) depicts selecting a single prediction 112 (one motion vector), with an additional binary bit specifying whether list 0, a first list, 114 is selected (e.g., shown as binary "0") or list 1, a second list 116 (e.g., shown as binary "1"), which by way of example is shown as identical to the conventional system of FIG. 4 to simplify implementation. The other alternative branch from the top of the tree is a binary "1" (on the right) depicting selection of bi-directional prediction taking two motion vectors (MVs) 118. An additional binary bit (e.g., shown as binary "1") then specifies 120 if one MV is taken per list, or if both MVs are from a single list 122 (e.g., shown as binary "0"). In the latter case another binary bit is then used to select from which list both MVs are taken from, either 124 taking both MVs from List 0 (e.g., shown as binary "0"), or 126 taking both MVs from List 1 (e.g., shown as binary "1").

Figure 6:
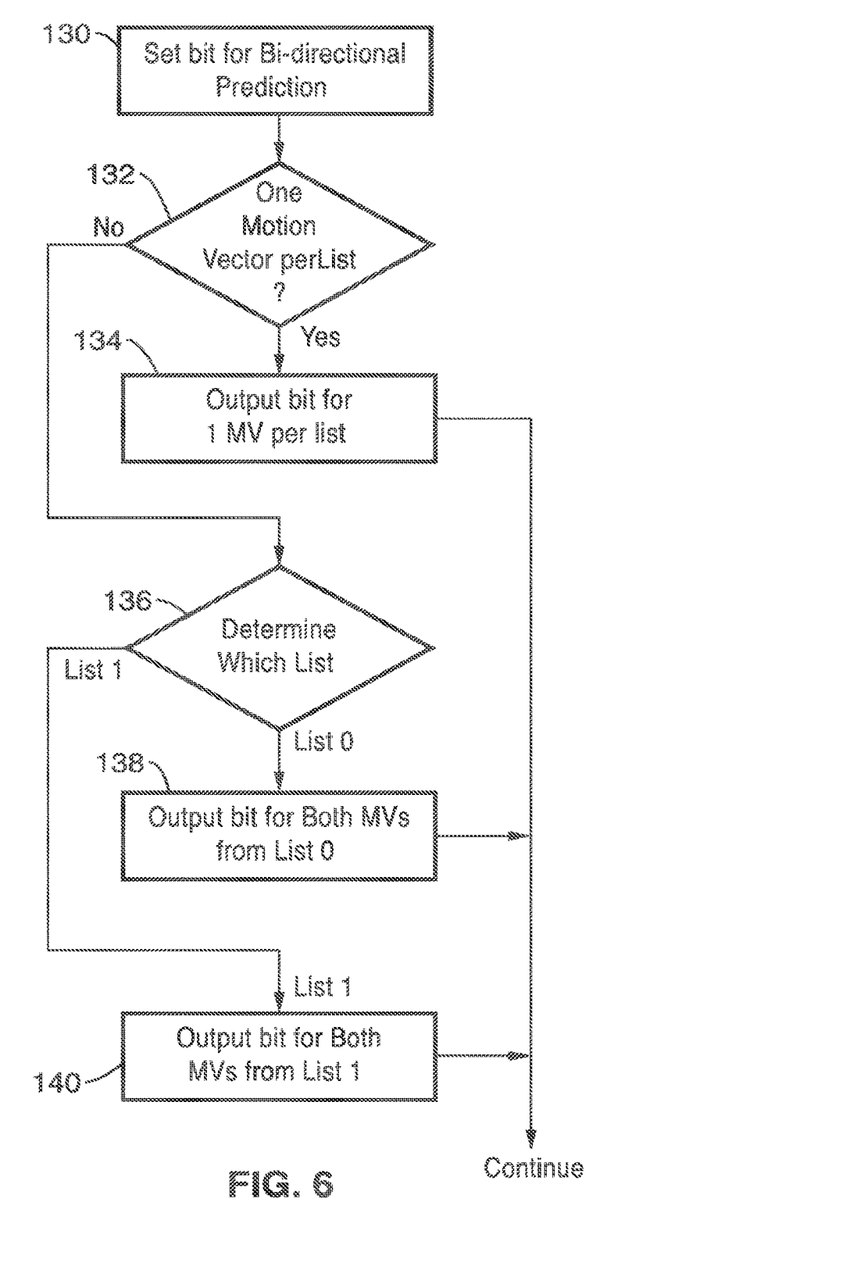
FIG. 6 is a flow diagram of B-picture generalized bi-prediction according to an embodiment of the present invention.

FIG. 6 illustrates an example embodiment of the method for enhancing B-picture prediction according to the present invention. A bit is set 130 for selecting obtaining 2 MVs during bi-directional prediction. It will be noted that if the two MVs bit is not set, that programming can operate conventionally to select the single MV from either list. It is then decided 132 whether one motion vector is to be selected per list. If yes, then one MV is selected per list 134 and a bit is output to signal the decoder. Otherwise, it is determined 136 from which list both MVs are selected from, as either List 0 138 with a first bit output to signal the decoder, or List 1 140 with a second bit output for signaling the decoder. The specific bit polarities are not described above, as one of ordinary skill in the art will appreciate that the logic can be inverted, or other replacement coding utilized without departing from the teachings of the present invention.

From the description herein, it will be further appreciated that the invention can be embodied in various ways, which include but are not limited to the following. As can be seen, therefore, the present invention includes the following inventive embodiments among others:

1. A system for performing video coding of B pictures, comprising: an encoder having a computer configured for video encoding; and programming adapted for execution on the computer of said encoder for: performing intra-prediction on I-frames for reducing spatial redundancies; performing inter-prediction on P and B frames for reducing temporal redundancies; performing enhanced bi-directional prediction on B-frames by selecting both motion vectors from either said first list or said second list; encoding binary bits to communicate selection of motion vectors; and a decoder having a computer configured for video decoding; programming adapted for execution on the computer of said decoder for; decoding binary bits during bi-directional prediction on B-frames to utilize enhanced bi-directional prediction by selecting both motion vectors from either said first list or said second list; and performing inter-prediction on B-frames in response to said decoding.

2. An apparatus for performing video encoding of B pictures, comprising: a computer configured for video encoding; and programming adapted for execution on said computer for: performing intra-prediction on I-frames for reducing spatial redundancies; performing inter-prediction on P and B frames for reducing temporal redundancies; performing enhanced bi-directional prediction on B-frames by selecting both motion vectors from either said first list or said second list; and encoding binary bits to communicate the enhanced bi-directional prediction with selection of motion vectors to a decoder.

3. The apparatus of embodiment 2, wherein said programming adapted for execution on said computer is configured for performing said bi-directional prediction on B-frames during motion estimation and motion compensation.

4. The apparatus of embodiment 2, wherein said programming adapted for execution on said computer is configured to encode binary bits to communicate the selection of motion vectors to a decoder by: encoding an additional binary bit indicating whether one motion vector has been selected from each list, or both motion vectors are from a single list; and encoding an additional binary bit indicating whether both motion vectors are from a first list, or both are from a second list.

5. The apparatus of embodiment 2, wherein said programming adapted for execution on said computer is further configured for performing conventional bi-directional prediction on B-frames by selecting one motion vector per list, or one motion vector from each list, and encoding binary bits to communicate these bi-directional prediction with selection of motion vectors to a decoder.

6. The apparatus of embodiment 2, wherein said apparatus reduces compression noise by an averaging process which utilizes both motion vectors from either said first list or said second list.

7. The apparatus of embodiment 2, wherein said video coding apparatus operates with High Efficiency Video Coding (HEVC) coders.

8. The apparatus of embodiment 2, wherein decisions of prediction direction are determined in response to rate-distortion cost.

9. An apparatus for performing video decoding of B pictures, comprising: a computer configured for video decoding within a decoder apparatus; and programming adapted for execution on said computer for: decoding binary bits during bi-directional prediction on B-frames to utilize enhanced bi-directional prediction by selecting both motion vectors from either said first list or said second list; and performing inter-prediction on B-frames in response to said decoding.

10. The apparatus of embodiment 9, wherein said programming adapted for execution on said computer is configured for selecting both motion vectors from either said first list or said second list is performed during motion compensation within said decoder.

11. The apparatus of embodiment 9, wherein said programming adapted for execution on said computer is configured to decode binary bits received from an encoder to determine the selection of motion vectors, decoding an additional binary bit indicating whether one motion vector has been selected from each list, or both motion vectors are from a single list, and decoding an additional binary bit indicating whether both motion vectors are from a first list, or both are from a second list.

12. The apparatus of embodiment 9, wherein said programming adapted for execution on said computer is further configured for performing bi-directional prediction on B-frames by selecting one motion vector per list, or one motion vector from each list, and decoding binary bits during bi-directional prediction.

13. The apparatus of embodiment 9, wherein said apparatus reduces compression noise by an averaging process which utilizes both motion vectors from either said first list or said second list.

14. The apparatus of embodiment 9, wherein said apparatus operates with High Efficiency Video Coding (HEVC) coders.

15. A computer-readable media which is non-transitory and contains a computer program executable on a computer configured for performing video encoding, comprising: performing intra-prediction on I-frames for reducing spatial redundancies; performing inter-prediction on P and B frames for reducing temporal redundancies; performing enhanced bi-directional prediction on B-frames by selecting both motion vectors from either said first list or said second list, or by selecting both motion vectors from a single reference frame; and encoding binary bits to communicate the selection of motion vectors to a decoder by encoding an additional binary bit indicating whether one motion vector has been selected from each list, or both motion vectors are from a single list, and encoding an additional binary bit indicating whether both motion vectors are from a first list, or both are from a second list.

16. The apparatus of embodiment 15, wherein said programming adapted for execution on said computer is configured for performing said bi-directional prediction on B-frames during motion estimation and motion compensation.

17. The apparatus of embodiment 15, wherein said programming adapted for execution on said computer is configured to encode binary bits to communicate the selection of motion vectors to a decoder by: encoding an additional binary bit indicating whether one motion vector has been selected from each list, or both motion vectors are from a single list; and encoding an additional binary bit indicating whether both motion vectors are from a first list, or both are from a second list.

18. The apparatus of embodiment 15, wherein said programming adapted for execution on said computer is further configured for performing bi-directional prediction on B-frames by selecting one motion vector per list, or one motion vector from each list, and encoding binary bits to communicate these bi-directional prediction with selection of motion vectors to a decoder.

19. The apparatus of embodiment 15, wherein said apparatus reduces compression noise by an averaging process which utilizes both motion vectors from either said first list or said second list.

20. The apparatus of embodiment 15, wherein said video coding apparatus operates with High Efficiency Video Coding (HEVC) coders.

Embodiments of the present invention may be described with reference to flowchart illustrations of methods and systems according to embodiments of the invention, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A decoding apparatus, comprising:
    circuitry configured to:
        decode a bit stream including a plurality of binary bits that indicates an inter-prediction on B frames, wherein
            a first bit of the plurality of binary bits indicates the inter-prediction is based on two motion vectors,
            a second bit of the plurality of binary bits indicates the two motion vectors are selected from one of a same list or different lists,
            a third bit of the plurality of binary bits indicates the two motion vectors are selected from one of a first list or a second list, and
            the two motion vectors include a first motion vector and a second motion vector; and
        execute the inter-prediction on the B frames based on the two motion vectors, the first bit, the second bit, and the third bit.

2. The decoding apparatus of claim 1, wherein the circuitry is further configured to execute bi-directional prediction on the B frames.

3. The decoding apparatus of claim 2, wherein the executed bi-directional prediction on the B frames provides motion compensation.

4. A decoding method, comprising:
    decoding a bit stream including a plurality of binary bits that indicates an inter-prediction on B frames, wherein a first bit of the plurality of binary bits indicates the inter-prediction is based on two motion vectors, a second bit of the plurality of binary bits indicates the two motion vectors are selected from one of a same list or different lists, a third bit of the plurality of binary bits indicates the two motion vectors are selected from one of a first list or a second list, and the two motion vectors include a first motion vector and a second motion vector; and executing the inter-prediction on the B frames based on the two motion vectors, the first bit, the second bit, and the third bit.

5. The decoding method of claim 4, further comprising executing bi-directional prediction on the B frames.

6. The decoding method of claim 5, wherein the executed bi-directional prediction on the B frames provides motion compensation.

\* \* \* \* \*